March 7, 1939.   C. CHILOWSKY   2,150,051
PHOTORESPONSIVE APPARATUS
Filed March 4, 1937
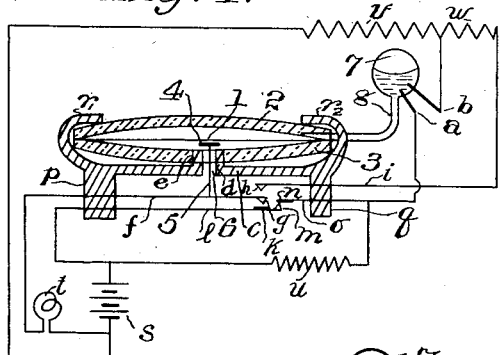
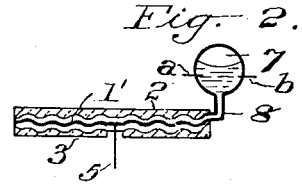
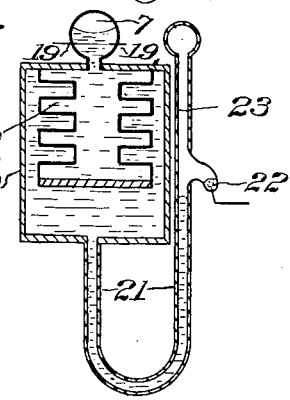
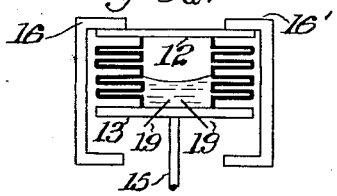
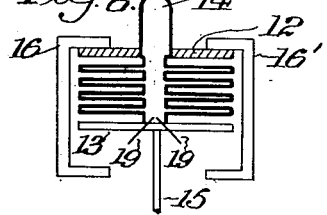
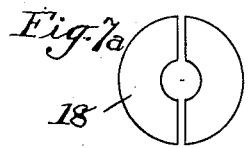
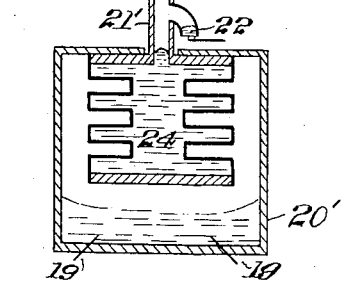
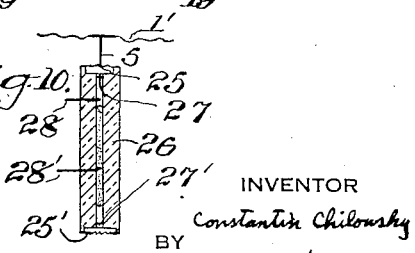
INVENTOR
Constantin Chilowsky
BY
Brown & Seward
ATTORNEYS

Patented Mar. 7, 1939

2,150,051

UNITED STATES PATENT OFFICE 2,150,051

PHOTORESPONSIVE APPARATUS

Constantin Chilowsky, Paris, France

Application March 4, 1937, Serial No. 129,105
In France March 6, 1936

15 Claims. (Cl. 200—52)

The present invention relates to apparatus for translating modifications of luminosity into mechanical actions by making use of a photo-chemical reaction of the gases obtained through an electrolytic action on a liquid, accompanied by variation of volume of said gases, in which apparatus the elements necessary to the reaction are placed in a space arranged in such manner as to avoid any exchange of matter between these elements and the outside, while permitting the variations of volume and pressure that take place inside this space to exert a mechanical action on any controlled elements.

Devices of this kind are described in the French Patent No. 795,681, filed by me on September 7, 1935; and in my United States application Serial No. 40,657, of which this case is a continuation in part.

Among the apparatus described in this patent, I have shown an apparatus in which a flexible membrane, for instance of platinum, moving under the effect of the pressure variations produced by the action of variations of luminosity on a photo-sensitive gaseous mixture of chlorine and hydrogen, acts mechanically upon one or several electrical contacts so as to close or open a circuit. However, due to the fact that the displacements thus obtained are very small, the operation is defective and it is necessary to provide an amplification by means of levers. This introduces into the system a still greater unreliability in the working. Furthermore, the use of platinum membranes of large area has many drawbacks, in particular the possibility of attack of platinum by chlorine and an unstable working due to the absorption of the gases by platinum.

The substitution of a glass membrane for the platinum membrane, which is also suggested in the patent above mentioned, further increases the difficulties of this solution. This results from the fact that glass membranes permit only slight linear displacements, necessitate high pressures and may not be satisfactorily sensitive. Furthermore, if thin glass membranes are used, their brittleness constitutes a very serious disadvantage.

The object of the present invention is to provide apparatus of the kind above referred to, having glass membranes, which permit of obtaining very large amplitudes of displacement with perfect safety, under the effect of low variations of pressure, that is to say with a high sensitiveness.

According to the present invention, I make use of very thin glass membranes placed under special working conditions which ensure perfect safety of operation and eliminate the possibility of accidents.

In general, this result is obtained by strictly limiting the amplitude of the elastic displacements and deformations of the glass membrane, preferably over the whole of the area thereof. The membrane is placed between two plates of thick glass or of suitable reinforced glass, the whole being welded along the periphery in such manner as to constitute a triple blade. The thick glass plates are slightly curved, in such manner as to give the membrane a possibility of displacement of a given amplitude. The space between one of the thick glass plates and the membrane is connected, through suitable means with the reaction chamber. The second thick glass plate is perforated at its center so as to leave a passage for a mechanical member connected to the central part of the flexible membrane and intended to exert the desired mechanical action and in particular to act upon electric contacts. The membrane is preferably reinforced in its central part by a rigid disc in such manner as to be able to transmit a rather strong pressure.

I may also, according to the invention, weld the membrane, along its periphery, to only one glass plate, the plate located on the other side of the membrane and which is provided with an aperture in its central part, being glued or merely strongly applied along its periphery.

According to another embodiment of the present invention, in order to permit of increasing the amplitude of the displacements of the membrane, the latter is made of corrugated glass, and the surfaces that serve to limit the amplitude of the displacements of the membrane are preferably also corrugated in a shape corresponding to the corrugations of the membrane. I may still further increase the amplitude by making use of shells made of two corrugated thin blades placed between surfaces limiting the deformations of the shell from the outside, the two plates being applied against each other on their inner faces under the effect of the suction.

According to still another embodiment of the invention, permitting further increased sensitiveness of the apparatus, together with considerable amplitudes of displacement, I make use of thin glass bellows, suitable elements limiting the displacements of the bellows, as well on the outside as on the inside, the elements of the bellows having, on the inside and the outside, surfaces against which they bear, which ensures the safety of their operation.

According to the invention, bellows of this kind communicate with a separate reaction chamber. However according to an embodiment of the invention, the inside of the bellows constitutes the reaction chamber. This leads to making reaction chambers the walls of which are wholly elastic and in which the expanding element also forms the reaction chamber.

Finally, according to still another feature of the invention, expansible glass bellows such as above set forth are employed not only for acting directly, in a mechanical manner, upon electric contacts but also in such manner as to produce displacements of large amounts of mercury, which permit of closing and opening electric circuits through which considerable currents are flowing.

For this purpose, the bellows is placed in a vessel filled with mercury, in communication with a tube in which a column of mercury is movable.

Finally, in order to obtain a sudden cutting off of a current, I may, according to the invention, make use of a shell, a corrugated membrane, or a bellows the deformation of which takes place suddenly, with a snap-like action.

Other features of the present invention will result from the following detailed description of some specific embodiments thereof.

Preferred embodiments of the present invention will be hereinafter described, with reference to the accompanying drawing, given merely by way of example and in which:

Fig. 1 is an apparatus according to the invention having a glass membrane acting directly on a system of contacts;

Fig. 2 shows an apparatus of the same type with a corrugated membrane;

Fig. 3 diagrammatically shows an apparatus according to the invention having a glass shell;

Figs. 4 and 4a are diagrammatical views showing two embodiments of bellows elements;

Figs. 5 and 5a show two bellows the elements being made according to the embodiments of Figs. 4 and 4a, respectively;

Fig. 6 shows an apparatus according to the invention including a bellows;

Fig. 7 shows a detail of such a bellows;

Fig. 7a is a plan view corresponding to Fig. 7;

Fig. 8 shows an apparatus according to the invention in which a bellows acts upon a mass of mercury so as to produce displacements of a mercury column;

Fig. 9 shows another embodiment, of the same type;

Fig. 10 shows an apparatus including a mercury column actuated through a glass membrane, according to the invention.

In the drawing, Fig. 1 shows an apparatus including a thin glass membrane 1, disposed between two thick glass discs or plates 2 and 3, the whole being welded together along the periphery. Discs 2 and 3 are slightly concave so as to give membrane 1 a play sufficient for its displacements. Membrane 1 bears, in its central part, against a rigid reinforcing plate 4 carrying a rod 5 extending through an orifice b of a metallic mounting c. Rod 5 is guided in hole b by a tubular flange d of setting c. This tubular flange d is engaged in a central hole e provided in glass plate 3. Rod 5 is rigidly secured to spring f, carrying contact g, opposite which there is provided, on the one hand, contact h carried by spring blade i, and, on the other hand, contact k, carried by spring blade l. A prolonged portion of blade l carries contact m opposite which there is provided a contact n carried by blade o. Blades l and f are carried by support p; blades i and o are carried by support q. Both of these supports are rigid with the mounting c; and the latter is provided also with flanges $r^1$ and $r^2$ bent over the edges of the triple glass plate and serving to mechanically connect the system of contacts with the system of glass discs.

Plate 3 can be made of a material different from glass, and it may be glued or mechanically applied along its edge against the edge of system 1—2.

The variations of the pressure of the gases located in a chamber 7 are transmitted through a pipe 8 to the upper part of the membrane, which in turn mechanically acts upon the contacts.

These contacts work in the following manner:

When the illumination decreases, the pressure in chamber 7 increases and it is transmitted through conduit 8 to the upper face of the membrane, thus pushing it downwardly, together with members 4, 5, f and g. Contact g touches contact k and closes the circuit including battery s and lamp t. If the darkness increases, producing an increase of the pressure in 7, contact k moves a greater distance and drives contact m away from contact n. At this time, the electrolytic current through the electrodes a, b is cut between contact m and n and it is compelled to flow through the resistance u, which is relatively great (for instance one megohm) in such manner as to reduce the electrolytic current to a negligible value, or even wholly to eliminate this current, the voltage of battery s being still maintained on electrodes a and b. As soon as the illumination increases and the pressure drops correspondingly in chamber 7, the electrolytic current is restored to its initial value and if the illumination further increases, contact g leaves contact k and lamp t is switched off.

If the illumination further increases, contact g touches contact h and the electrolytic current, instead of passing merely through resistance v, which is relatively great, also passes through resistance w, which is generally smaller. The intensity of the electric current increases considerably, which accelerates the working of the apparatus when passing from a strong illumination to darkness.

In Fig. 2, I have shown a similar device, but the thin glass membrane 1' is corrugated. Corresponding corrugations are provided on the inner faces of plates 2 and 3.

In Fig. 3, I have shown a device including a thin glass shell 1″—1‴, the corrugations of which are preferably in correspondence, plates 1″ and 1‴ being welded together along their periphery. The space between these two plates communicates with the reaction and electrolysis chamber 7. The shell is placed on the inside of a chamber formed by two rigid plates 9 and 10. When a suction is produced, plates 1″ and 1‴ are applied against each other, being thus mutually supported. On the contrary, in case of overpressure, these plates are applied away from each other, and their displacement is limited by the slightly concave discs 9 and 10. The whole of the thin plates and the rigid discs 9 and 10 can be fixed together along the periphery. The reaction chamber may constitute the stationary part of the apparatus.

In the above mentioned arrangement, use is made of glass membranes, and in particular corrugated glass membranes, the stable position of which is either their intermediate, symmetric, position, or one of their extreme positions. In the latter case, under the effect of sudden pressure variations, the membrane snaps from one extreme position to the other extreme position, which produces a sudden opening or closing of the electric current.

In order to obtain such membranes, they are given a preliminary deformation, or curvature.

According to the present invention, it is particularly advantageous to replace the single flexible membrane of Figs. 1 and 2 by a plurality of juxtaposed flexible membranes, each of which can be much thinner than the single membrane above mentioned. These membranes can be welded together along their periphery and also welded together with one or two other plates of greater thickness on their common periphery.

These flexible multiple membranes can be used in all cases in which it is desired to separate the chamber containing the electrolysis liquid from the outside or the remainder of the apparatus, either in apparatus producing a direct mechanical action on contacts or in apparatus for the transmission of pressure to fluids.

This multiple membrane is very advantageous because it ensures a high flexibility combined with a considerable mechanical strength and an increased safety, since a crack in one of the elements does not destroy the fluidtightness of the whole.

The apparatus above described permits of obtaining a satisfactory amplitude of the displacements. However, when it is desired to have still more considerable amplitudes, it is advisable to have recourse, according to the present invention, to glass bellows such for instance as those which will be hereinafter described. These bellows are advantageously obtained by welding together very thin glass blades and giving them, as well on the inside as on the outside, surfaces which limit their expansion deformations to a predetermined value.

In Fig. 4, I have shown a pair of elements of a bellows according to the invention, this pair being constituted by two thin blades 11 and 11', perforated at the center, and welded together along their central openings.

In Fig. 4a, I have shown another embodiment in which discs 11 and 11' are disposed slightly apart from each other and connected together by a tubular portion which may be formed when perforating the discs and assembling them by welding.

In Figs. 5 and 5a, I have shown two bellows constituted respectively by the elements of Figs. 4 and 4a. The external edges of the consecutive pairs are welded together along their periphery, thick plates 12 and 13 forming the upper and lower walls of the system. In the examples of Figs. 5 and 5a, the reaction chamber is constituted by the inside of the bellows.

In the example of Fig. 6, the reaction chamber is constituted by a separate part 14 welded to the upper plate 12 around an opening thereof. The lower plate carries a rod 15 which can be suitably guided and transmits the movements of the bellows to the electric contacts of any other mechanical elements.

The upper plate is fixed to a casing the lower part 16' of which limits the expansion of the bellows and forms the lower bearing surface. In order to prevent the suction in the reaction chamber for crushing the bellows, I insert in the intervals 17 between the bellows elements rings such as 18 (see Fig. 7).

This figure shows the position of the rings which may for instance be made of two parts (Fig. 8) so as to facilitate their setting in position. These rings can also be made of a single part and in this case they are inserted between the bellows elements prior to their being welded together.

It will be noted that the inner diameter of the elements is sufficiently large, in the example of Figs. 5 and 5a, for forming the reaction chamber, the electrodes 19 being for instance provided in the lower plate. On the contrary, in the example of Fig. 6, the method of welding and perforating the plates does not leave a sufficient volume on the inside, the reaction chamber consisting in this case of a separate chamber 14 fixed to the bellows.

As above stated, it is possible, according to the invention, to make use of such bellows not only for acting directly upon a mechanical element, but also for displacing columns of mercury. This is especially advantageous in the case of electric currents of high intensity flowing through circuits controlled by the apparatus according to the invention. With such devices, it is possible to make use of mercury columns of very large section.

Such apparatus is shown in Figs. 8 and 9.

In the example of Fig. 8, I have shown at 29 a glass bellows communicating with the reaction chamber 7. This bellows is located on the inside of a vessel 20 filled with mercury and prolonged by a tube 21 in which the mercury column is movable. I can provide in the upward branch of the tube a recess 22 filled with mercury and forming a contact. I may also provide a limiting contact 23 as described in the patent and application above-mentioned. The deformations of the bellows produce displacements of the mercury column and consequently the closing and opening of the contacts.

I may of course, without departing from the principle of the invention, fill a portion of the chamber 20 with any inert gas.

In Fig. 9, I have shown a device of the same type but working in an inverse manner. In this case, the inside of the bellows is filled with mercury which extends upwardly through a tube 21', chamber 20' being used as reaction chamber. The mercury is shown at 24 and the electrodes at 19.

According to the present invention, this bellows may be made of moulded glass.

Finally, in Fig. 10, I have shown an indirect action device in which the mercury column is of very small section and is actuated by relatively high pressures. In this example, membrane 1' or any other movable element of the device above-described acts upon a membrane or a bellows of smaller diameter 25 fixed in any suitable manner upon the end of the capillary tube 26 containing the mercury column of very small section which moves along the conduit under the effect of the displacements of membrane 25. A second membrane 25' facilitates these displacements by reducing the resistance at the opposite end of the column. I have shown at 27 and 27' limiting porous plugs. I have shown at 28 and 28' two electric contacts. Of course, tube 26 may have the shape of a U. In this arrangement, small pressure variations acting upon membrane 1' are capable of overcoming considerable frictions of the same column of mercury. This arrangement has the advantage that the mercury column (of a diameter ranging from 0.2 to 0.5 millimeter) does not break easily under the effect of shocks and jars, the apparatus having a high degree of safety under all conditions.

In a general manner, while I have, in the above description, disclosed what I deem to be practical and efficient embodiments of the present invention, it should be well understood that I do not wish to be limited thereto as there might be changes made in the arrangement disposition and form of the parts without departing from the principle of the present invention, as comprehended within the scope of the accompanying claims.

What I claim is:

1. An apparatus which comprises, in combination, a vessel forming a reaction chamber containing chemical substances capable of producing variations of the pressure in said chamber in response to variations of the illumination of said chamber, at least one thin glass wall closing said chamber, and rigid means for limiting the deformations of said glass wall.

2. An apparatus which comprises, in combination, a vessel forming a reaction chamber containing chemical substances capable of producing variations of the pressure in said chamber in response to variations of the illumination of said chamber, at least one thin glass membrane closing said chamber and two rigid members located on either side of said membrane for limiting the deformations of said membrane.

3. An apparatus which comprises, in combination, a vessel forming a reaction chamber containing chemical substances capable of producing variations of the pressure in said chamber in response to variations of the illumination of said chamber, at least one thin glass membrane closing said chamber, two rigid members located on either side of said membrane for limiting the deformations of said membrane, a hole in one of said members, and a rod fixed to said membrane extending through said hole and adapted to exert a mechanical action.

4. An apparatus which comprises, in combination, a vessel forming a reaction chamber containing chemical substances capable of producing variations of the pressure in said chamber in response to variations of the illumination of said chamber, at least one thin corrugated glass membrane closing said chamber and two rigid members located on either side of said membrane for limiting the deformations of said membrane.

5. An apparatus according to claim 4, in which the surfaces of said rigid members that are adapted to cooperate with said membrane, are also corrugated in a corresponding manner.

6. An apparatus which comprises, in combination, a vessel forming a reaction chamber containing chemical substances capable of producing variations of the pressure in said chamber in response to variations of the illumination of said chamber, two thin plates of glass welded along their peripheries so as to form a shell, the inside of which communicates with said chamber, and rigid members disposed on either side of said shell for limiting the deformations of the plates thereof.

7. An apparatus which comprises, in combination, a vessel forming a reaction chamber containing chemical substances capable of producing variations of the pressure in said chamber in response to variations of the illumination of said chamber, and a glass bellows communicating with said chamber, including a plurality of annular glass discs welded to one another alternately along their outer peripheries and their inner peripheries.

8. An apparatus which comprises, in combination, a vessel forming a reaction chamber containing chemical substances capable of producing variations of the pressure in said chamber in response to variations of the illumination of said chamber, a glass bellows communicating with said chamber including a plurality of annular glass discs welded to one another alternately along their outer peripheries and their inner peripheries and two thick end plates forming the top and bottom walls of said bellows, and rigid means for limiting the deformations of said annular glass discs.

9. An apparatus which comprises, in combination, a plurality of annular glass discs welded to one another alternately along their outer peripheries and their inner peripheries so as to form a bellows-shaped reaction chamber containing chemical substances capable of producing variations of the pressure in said chamber in response to variations of illumination in said chamber, two thick end plates for closing the top and bottom of said chamber, and rigid means for limiting the deformations of said annular discs.

10. An apparatus which comprises, in combination, a glass bellows including a plurality of annular glass discs welded to one another alternately along their outer peripheries and their inner peripheries and two thick end plates forming the top and bottom walls of said bellows, the upper end plate being provided with a central aperture, and a reaction chamber containing chemical substances capable of producing variations of the pressure in said chamber in response to variations of illumination in said chamber, said chamber being welded to said top end plate around the aperture thereof.

11. An apparatus according to claim 8 in which said rigid means include rigid rings inserted between the glass discs forming the bellows.

12. An apparatus according to claim 8 further including a vessel surrounding said bellows, a tube adapted to contain a mercury column communicating with said vessel, said vessel being adapted to contain a fluid adapted to transmit to the mercury column in said tube the effects of the deformations of said bellows.

13. An apparatus which comprises, in combination, a glass bellows including a plurality of annular glass discs welded to one another alternately along their outer peripheries and their inner peripheries and two thick end plates forming the top and bottom walls of said bellows, a tubular extension communicating with the inside of said bellows, said bellows being filled with mercury, and a vessel surrounding said bellows forming a reaction chamber containing chemical substances capable of producing variations of the pressure in said chamber in response to variations of illumination of said chamber.

14. An apparatus which comprises, in combination, a vessel forming a reaction chamber containing chemical substances capable of producing variations of the pressure in said chamber in response to variations of illumination of said chamber, a thin glass membrane subjected on one face to said pressure variations, a capillary tube provided at at least one end with an outlet of an area smaller than that of said membrane, a movable member closing said outlet, means for mechanically connecting said membrane and said member, a mercury column in said tube, and porous plugs in said tube on either side of said column.

15. An apparatus according to claim 14 in which said tube is provided with another outlet of an area corresponding to that of the first mentioned outlet, and a yieldable member closing said last mentioned outlet.

CONSTANTIN CHILOWSKY.